(12) United States Patent
Rautenbach et al.

(10) Patent No.: US 9,755,347 B2
(45) Date of Patent: Sep. 5, 2017

(54) SYSTEMS AND DEVICES FOR INSTALLING AN EVACUATION SLIDE ACTUATION CABLE IN A CONNECTION BOX ASSEMBLY OF AN EMERGENCY EVACUATION SLIDE AND OVERWING DOOR ACTUATION SYSTEM INTERFACE

(71) Applicant: GOODRICH CORPORATION, Charlotte, NC (US)

(72) Inventors: Helperus Ritzema Rautenbach, Scottsdale, AZ (US); Ryan Schmidt, Gilbert, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 137 days.

(21) Appl. No.: 14/971,709

(22) Filed: Dec. 16, 2015

(65) Prior Publication Data
US 2017/0179632 A1 Jun. 22, 2017

(51) Int. Cl.
*H05K 7/02* (2006.01)
*H01R 13/447* (2006.01)
(Continued)

(52) U.S. Cl.
CPC ........... *H01R 13/447* (2013.01); *B64D 25/14* (2013.01); *H01R 13/5205* (2013.01);
(Continued)

(58) Field of Classification Search
CPC H01R 13/447; H01R 13/453; H01R 13/4534; H01R 13/46; H01R 13/5205;
(Continued)

(56) References Cited

U.S. PATENT DOCUMENTS 5,875,868 A * 3/1999 Smialowicz ........... B64D 25/14
                                                      182/48
5,975,467 A * 11/1999 O'Donnell ............. B64D 25/14
                                                      182/48
(Continued)

FOREIGN PATENT DOCUMENTS

EP            1818258           8/2007

OTHER PUBLICATIONS

Extended European Search Report dated Mar. 21, 2017 in European Application No. 16203678.4.

*Primary Examiner* — Angel R Estrada
(74) *Attorney, Agent, or Firm* — Snell & Wilmer L.L.P.

(57) ABSTRACT

Connection box assembly is provided for connecting evacuation slide actuation cable of evacuation slide actuation system to evacuation slide inflation system. Connection box assembly comprises connection box, connection box lid coupled thereto, electrical connector blocker coupled to connection box lid, and connection box slider disposed within connection box. Connection box lid is configured to slide between an open and closed position. Electrical connector blocker is configured to prevent electrical connection to electrical connector coupled to evacuation slide inflation system when connection box lid is in open position and to permit electrical connection to electrical connector when connection box lid is in closed position. Connection box slider is positioned to receive first cable end of evacuation slide actuation cable when connection box lid is in open position. Connection box lid in closed position closes connection box retaining and sealing connection box slider and first cable end inside connection box assembly.

20 Claims, 12 Drawing Sheets

(51) Int. Cl.
*H01R 13/52* (2006.01)
*H01R 43/16* (2006.01)
*H01R 43/00* (2006.01)
*B64D 25/14* (2006.01)

(52) U.S. Cl.
CPC .......... *H01R 43/005* (2013.01); *H01R 43/16* (2013.01); *H01R 2201/26* (2013.01)

(58) Field of Classification Search
CPC ........ H01R 13/52; H01R 13/53; H01R 43/16; H01R 2201/26; H01R 2201/00; H01R 43/00; B64D 25/14; B64D 25/00; H02G 3/08; H02G 3/081; H05K 5/00; H05K 5/02; H05K 5/0217; H05K 5/0247; H05K 7/00; H05K 7/02
USPC .......... 174/50, 541, 520, 535, 542, 559, 59; 220/3.2–3.9, 4.02; 182/70, 48, 49, 148, 182/149; 244/137.2, 905
See application file for complete search history.

(56) References Cited

U.S. PATENT DOCUMENTS

| | | | |
|---|---|---|---|
| 6,644,596 B1* | 11/2003 | Jurlina | B64D 25/14 244/137.2 |
| 6,814,183 B2* | 11/2004 | Horvath | B64D 25/14 182/48 |
| 6,877,698 B2* | 4/2005 | Baker | B64D 25/14 182/48 |
| 7,434,600 B1 | 10/2008 | Swierkocki et al. | |
| 2004/0094671 A1 | 5/2004 | Moro et al. | |
| 2007/0199499 A1 | 8/2007 | Hughes | |

\* cited by examiner

SYSTEMS AND DEVICES FOR INSTALLING AN EVACUATION SLIDE ACTUATION CABLE IN A CONNECTION BOX ASSEMBLY OF AN EMERGENCY EVACUATION SLIDE AND OVERWING DOOR ACTUATION SYSTEM INTERFACE

FIELD

The present disclosure relates generally to aircraft evacuation slides. More particularly, the present disclosure relates to systems and devices for installing an evacuation slide actuation cable in a connection box assembly of an emergency evacuation slide and overwing door actuation system interface.

BACKGROUND

Commercial aircraft typically employ inflatable evacuation slides that deploy beneath exit doors during evacuation. The evacuation slides may be used in case of emergency by passengers exiting the aircraft. A fuselage-mounted evacuation slide may be stowed in a container a packboard) located underneath or below the exit close to the aircraft exterior.

Prior to departure (usually before engine startup), all the aircraft doors are placed into the "armed" mode. If a rapid evacuation is required and the doors are opened while "armed", the opening of the door initiates evacuation slide inflation. In order to ensure that inflation begins when the aircraft door is opened while armed, a fuselage-mounted evacuation slide actuation cable is connected by a connection box to the aircraft. Unfortunately, proper installation and connection of the evacuation slide actuation cable cannot be verified from within the aircraft.

SUMMARY

A connection box assembly is provided for connecting an evacuation slide actuation cable of an evacuation slide actuation system to an evacuation slide inflation system, according to various embodiments. The connection box assembly comprises a connection box, a connection box lid coupled to the connection box, an electrical connector blocker coupled to the connection box lid, and a connection box slider disposed within the connection box. The connection box lid is configured to slide between an open position and a closed position. The electrical connector block is configured to prevent electrical connection to an electrical connector coupled to the evacuation slide inflation system when the connection box lid is in the open position and to permit electrical connection to the electrical connector when the connection box lid is in the closed position. The connection box slider is positioned to receive a first cable end of the evacuation slide actuation cable when the connection box lid is in an open position. The connection box lid in the closed position closes the connection box to retain and seal the connection box slider and the first cable end inside the connection box assembly.

A system is provided for assuring connection of an evacuation slide actuation cable to an evacuation slide inflation system, in accordance with various embodiments. The system comprises an electrical connector coupled to the evacuation slide inflation system and a connection box assembly. The connection box assembly comprises a connection box, a connection box lid coupled to the connection box and configured to slide between an open position and a closed position, a connection box slider disposed within the connection box, and an electrical connector blocker coupled to the connection box lid. The connection box slider is positioned to receive a first cable end of the evacuation slide actuation cable when the connection box lid is in an open position. The connection box lid in the closed position closes the connection box to retain and seal the connection box slider and the first cable end inside the connection box assembly. The electrical connector blocker prevents electrical connection to the electrical connector prior to retaining and sealing the first cable end and the connection box slider inside the connection box assembly.

An installation assurance method is provided for connection of an evacuation slide actuation cable to an aircraft, in accordance with various embodiments. The installation assurance method comprises coupling an electrical connector blocker to a connection box lid of a connection box assembly. The connection box assembly comprises the electrical connector blocker, a connection box, the connection box lid coupled to the connection box, and a connection box slider disposed within the connection box. The connection box lid is configured to slide between an open position and a closed position. The connection box lid is slid to the open position wherein the electrical connector blocker prevents electrical connection to an electrical connector coupled to an evacuation slide inflation system. A first cable end of the evacuation slide actuation cable is inserted into the connection box and the connection box slider. The connection box lid is slid to the closed position thereby closing the connection box to retain and seal the connection box slider and the first cable end inside the connection box assembly and permit electrical connection to the electrical connector only after the connection box slider and the first cable end are retained and sealed inside the connection box assembly.

In any of the foregoing embodiments, the electrical connector blocker is configured to be connected to an electrical harness from the aircraft in response to the electrical connector being exposed. The electrical connector blocker permits connection of the electrical harness to the electrical connector in response to the first cable end of the evacuation slide actuation cable and the connection box slider being retained and sealed inside the connection box assembly. Connection of the electrical harness to the electrical connector permits a pressure sensor reading that does not occur if the first cable end of the evacuation slide actuation cable and the connection box slider are not retained and sealed inside the connection box assembly. The electrical connector blocker has a first end coupled to the connection box lid and a second free end opposite to the first end and configured to physically block the electrical connector by covering the electrical connector when the connection box lid is in the open position and to expose the electrical connector by uncovering the electrical connector when the connection box lid is in the closed position. The electrical connector blocker comprises a rigid, non-bendable material. The second free end has an opening therein to expose the electrical connector.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

Figure 1:
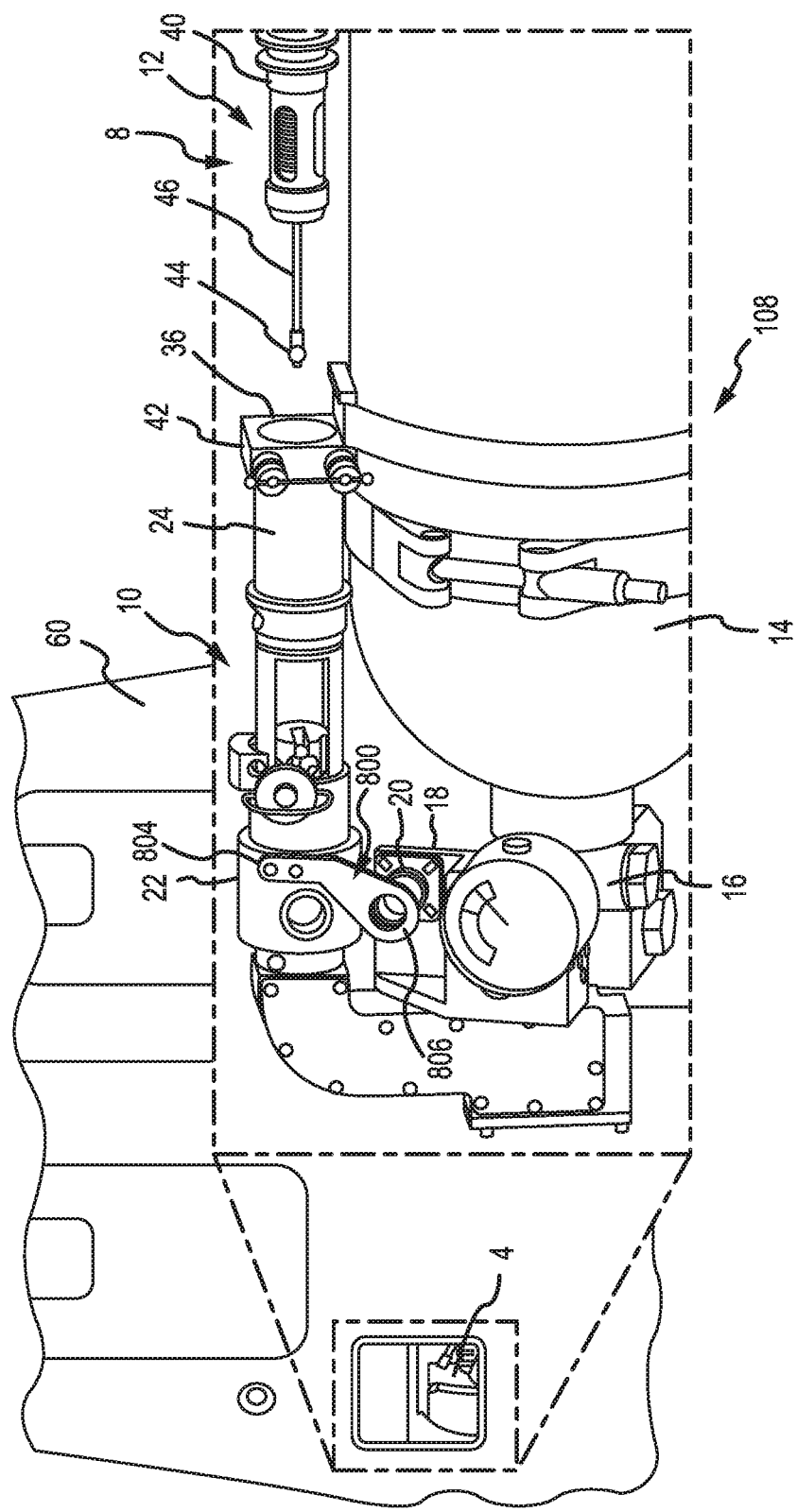
FIG. 1 is a diagram of a packboard in a wing to fuselage fairing for stowing a fuselage-mounted evacuation slide and a connection box assembly, the connection box assembly acting as an interface between a first cable end of an evacuation slide actuation cable and an evacuation slide inflation system, the connection box assembly illustrated with a connection box lid thereof in an open position and an electrical connector blocker physically blocking the electrical connector by covering the electrical connector and preventing connection of an electrical harness to the electrical connector, according to various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Various embodiments are directed to systems and devices for installing an evacuation slide actuation cable in a connection box assembly of an emergency evacuation slide and overwing door actuation system interface. Various embodiments ensure that an evacuation slide actuator cable tends to be retained and sealed (i.e., installed) within the connection box assembly prior to electrically connecting an electrical harness from the aircraft to an electrical connector of the connection box assembly, and such installation may be verified from within the aircraft. Therefore, visual verification through a viewing window associated with physical access to a packboard in the wing to fuselage fairing is obviated. Installation of the evacuation slide actuator cable ensures that inflation of the evacuation slide begins when the door is opened in an armed position. As noted previously, in order to ensure that the evacuation slide begins to inflate when the aircraft door is opened while armed, the evacuation slide actuation cable should be connected with the connection box assembly prior to electrical connection of the electrical harness.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As known in the art, an evacuation slide is an inflatable slide used to evacuate an aircraft quickly. The evacuation slide is packed and held within a packboard 4 (FIG. 1) disposed in the aircraft fuselage over a wing such that passengers exiting an emergency exit door would exit onto the wing. An evacuation slide may be disposed aft of the emergency exit door. An access panel may cover the packboard. An evacuation slide assembly 108 may jettison the access panel and deploy the inflatable evacuation slide in response to the emergency exit door opening. The inflatable evacuation slide may be used during aircraft evacuation, as well as evacuation for ships and building structures, according to various embodiments.

Figure 5:
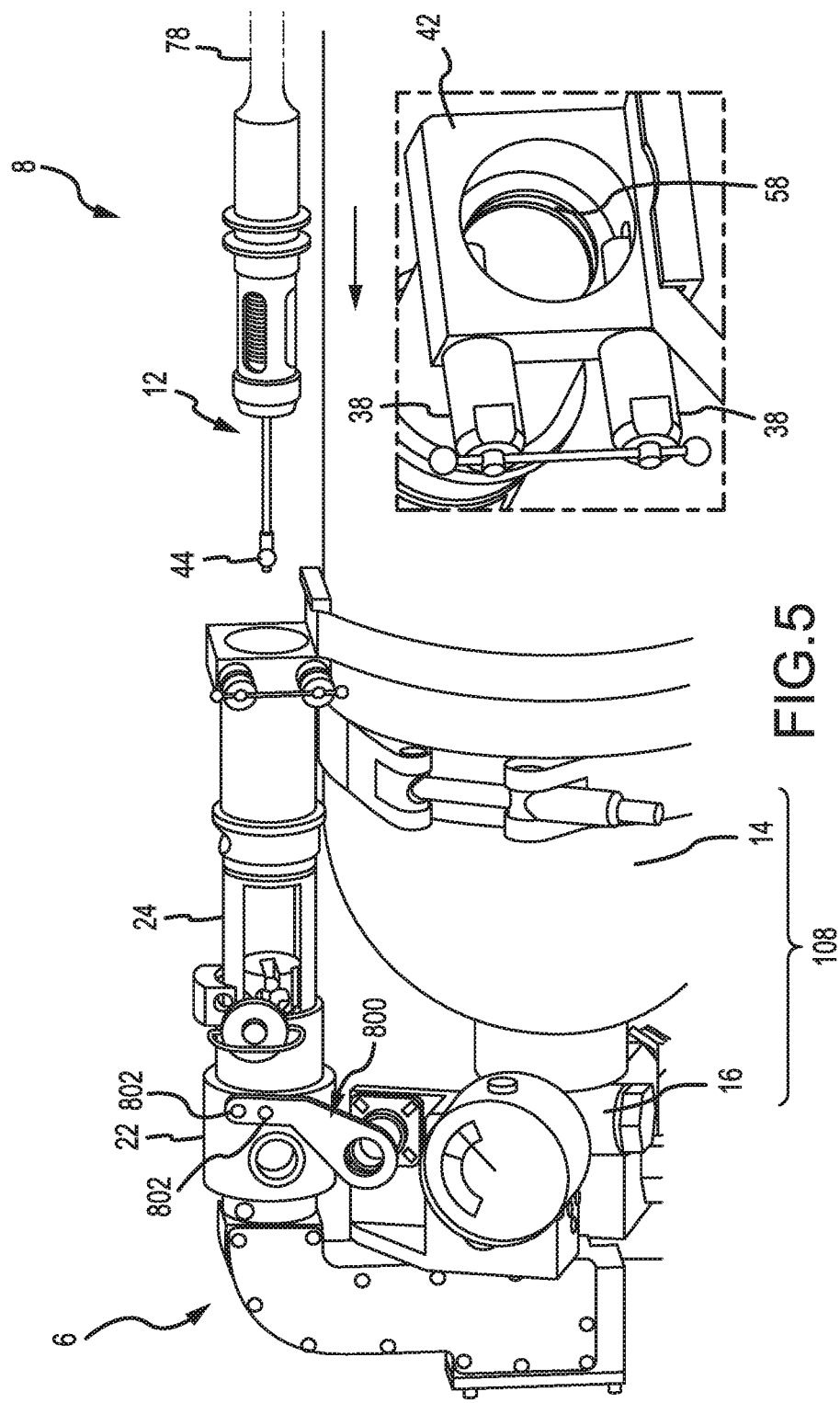
FIG. 5 is a diagram illustrating insertion of the first cable end into an open second end of the connection box and an enlarged view of the open second end of the connection box including a pair of spring-loaded plungers, according to various embodiments.

With reference to FIG. 1, according to various embodiments, the evacuation slide assembly is shown as viewed from a bottom of the aircraft with the access panel removed from an aircraft wing to fuselage fairing 60. The dotted line rectangle illustrates a view into the open packboard 4. An emergency evacuation slide may be released from the packboard 4 using various techniques. The mechanical interface between the offwing emergency evacuation slide assembly 108 and manual handle to an overwing door inflation actuation system interface is depicted. The overwing door inflation actuation system 6 (FIG. 5) comprises an evacuation slide actuation cable, a first cable end 12 of which is depicted in FIG. 5 and hereinafter described. The evacuation slide actuation cable 8 routes through the aircraft and interfaces with a connection box assembly 10 at the first cable end 12 and a manual inflation handle on the aircraft at an opposite, second cable end. The evacuation slide is inflated in response to the overwing emergency exit doors being opened. The door opening pulls the first cable end 12 of the evacuation slide actuation cable 8, permitting inflation of the evacuation slide.

Still referring to FIG. 1 and now to FIGS. 5 through 11, the evacuation slide inflation system 108 includes the connection box assembly 10 that acts as an interface between the evacuation slide actuation cable 8 and the evacuation slide inflation system 108. The evacuation slide inflation system 108 comprises a charged cylinder 14 that provides pressurized gas to inflate the evacuation slide. A mounting platform 18 may be mounted on a regulator valve 16 of the evacuation slide inflation system 108 (FIG. 5) and be operatively connected to the charged cylinder 14. An electrical connector 20 may extend from the mounting platform 18 of the inflation system. The electrical connector 20 may be oriented perpendicular from the mounting platform 18. The electrical connector 20 is configured to be connected to an electrical harness from the aircraft. Connection of the electrical harness to the electrical connector enables electronic pressure monitoring of the charged cylinder 14.

Figure 2:
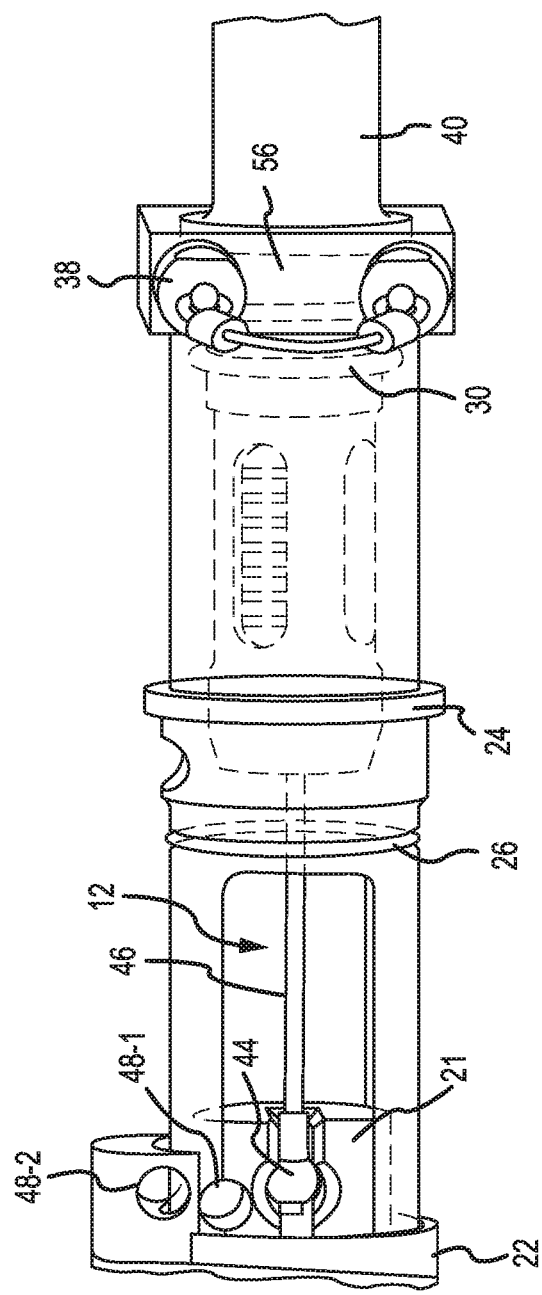
FIG. 2 is a diagram illustrating an interface between the connection box assembly of FIG. 1 (the connection box lid thereof in the open position) and the first cable end of the evacuation slide actuation cable, according to various embodiments.
Figure 3:
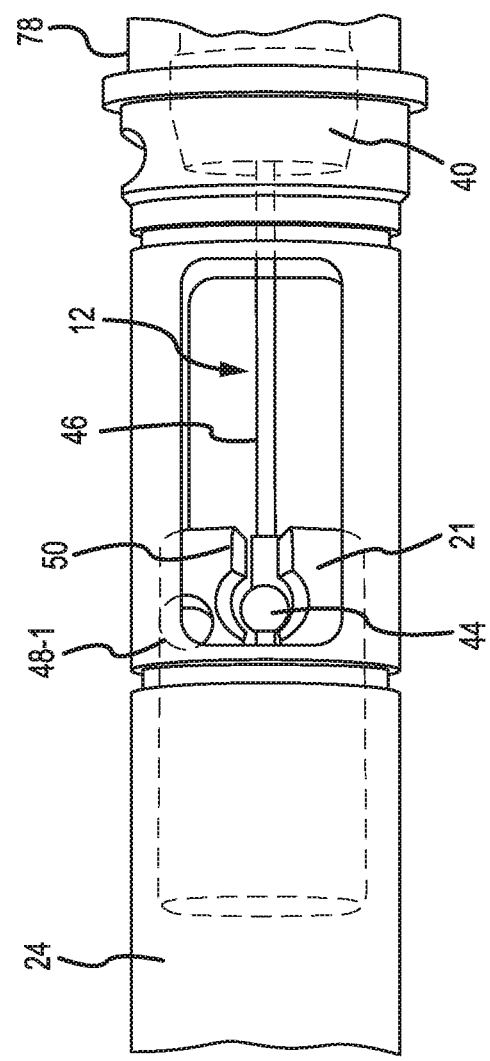
FIG. 3 is a diagram illustrating a cable installation slot in a connection box slider for receiving a rigid ball end of the first cable end, according to various embodiments.
Figure 8:
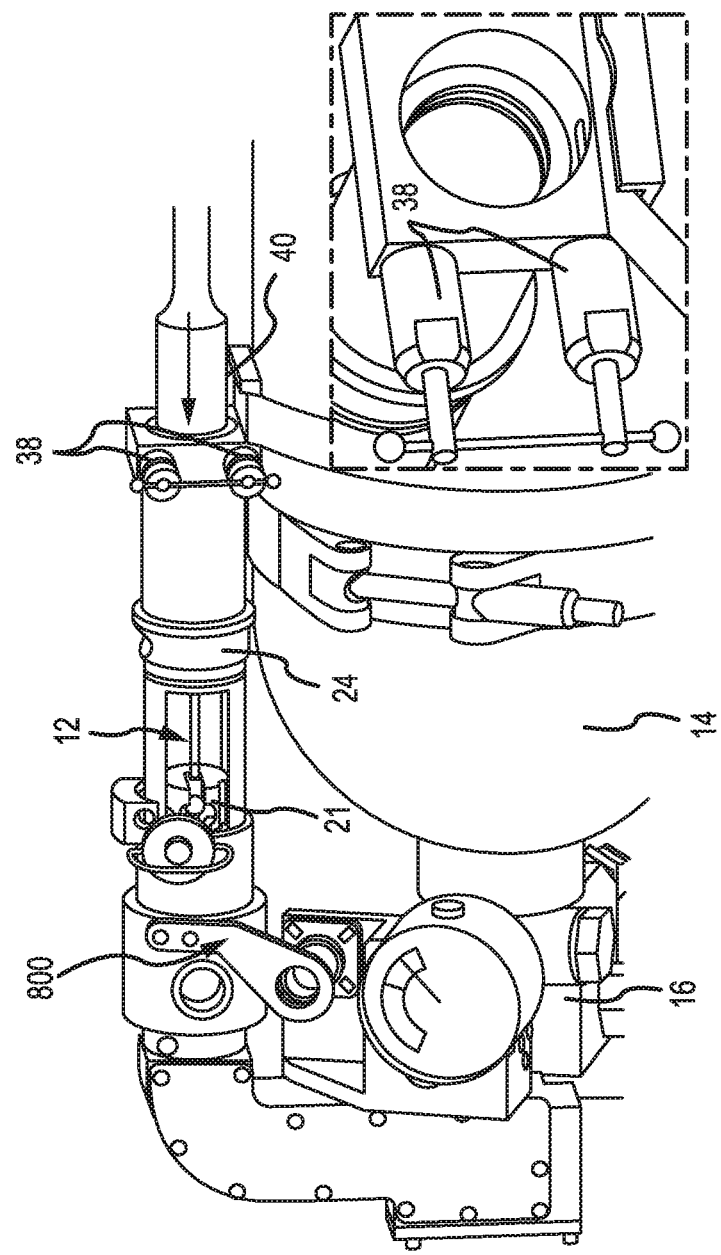
Figure 9:
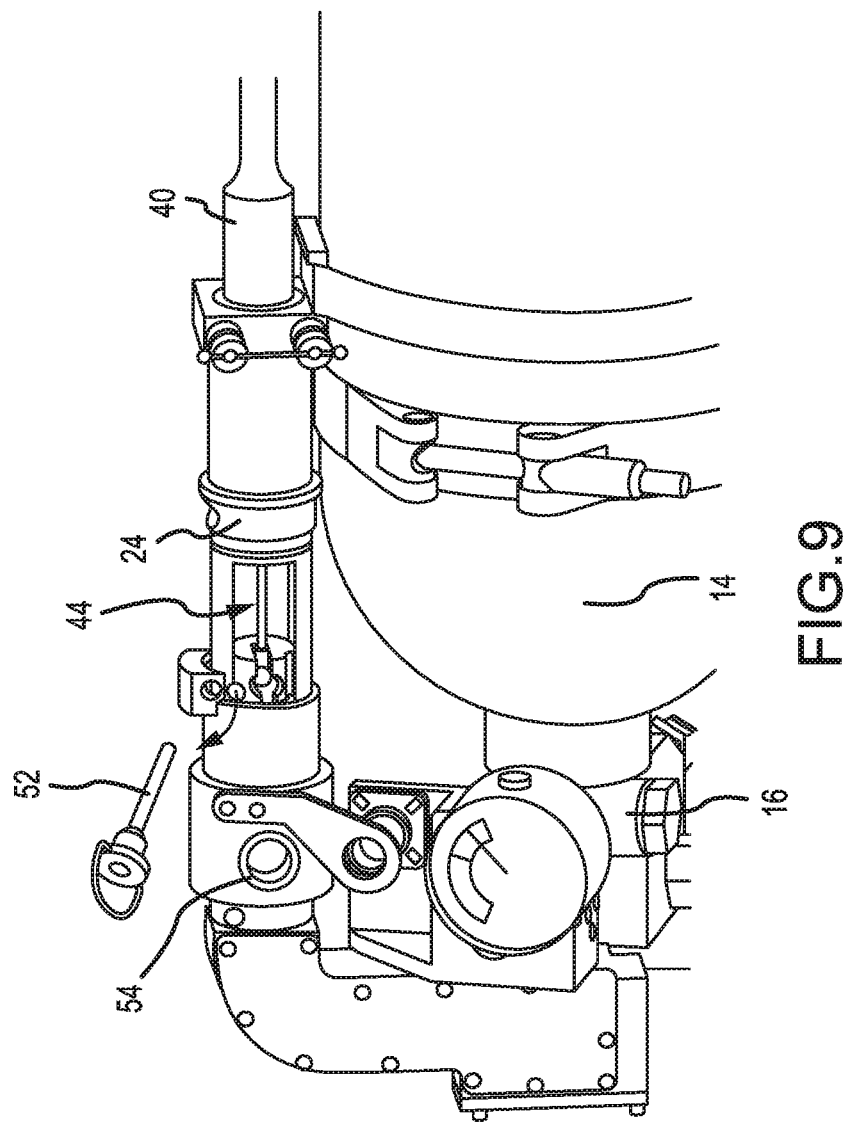
FIG. 9 illustrates removal of a safety pin from a first safety pin opening in the connection box slider with the connection box lid in the open position, according to various embodiments.
Figure 10:
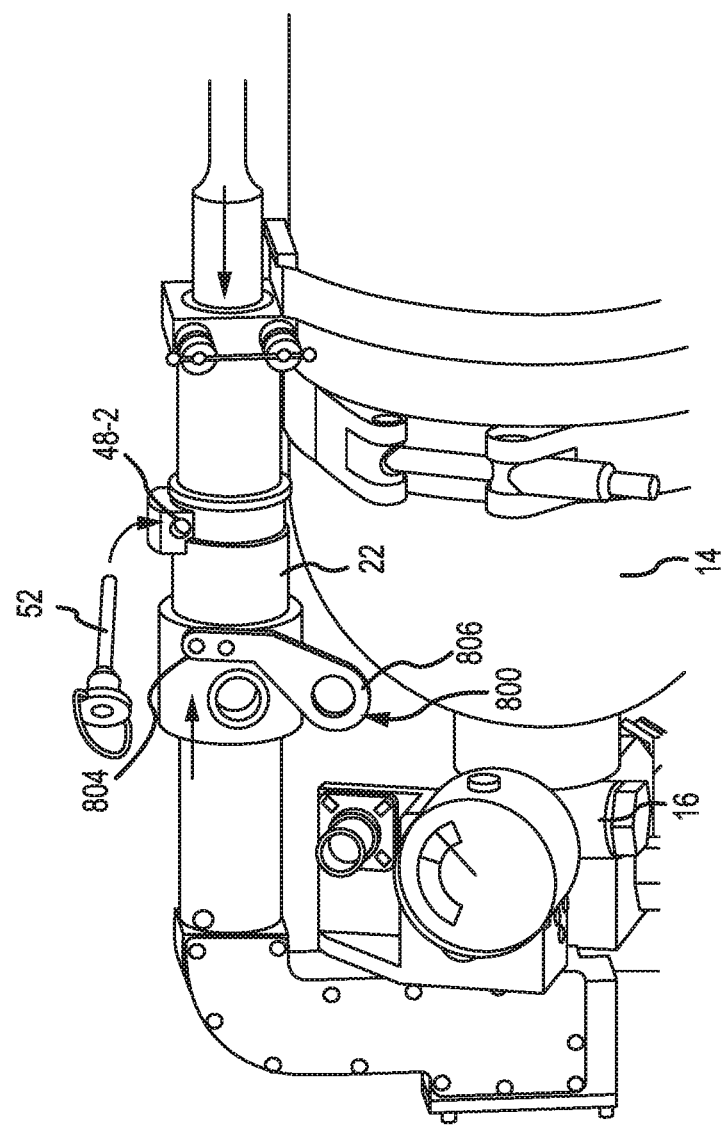
FIG. 10 illustrates sliding the connection box lid to a closed position and inserting the safety pin in a second safety pin opening thereof, the electrical connector blocker of the connection box assembly in a non-blocking position permitting connection of the electrical harness to the electrical connector after installation of the evacuation slide actuation cable in the connection box assembly is complete, according to various embodiments.

Still referring to FIGS. 1, 5 through 11, and now to FIGS. 2 and 3, according to various embodiments, the connection box assembly 10 comprises the connection box lid 22 coupled to a connection box 24. A connection box slider 21 is disposed within the connection box 24. The connection box slider 21 is movable by pulling the first cable end 12 of the evacuation slide actuation cable 8 to initiate the evacuation slide inflation system 108. The connection box slider 21 is positioned to receive the first cable end 12 of the evacuation slide actuation cable 8 when the connection box lid 22 is in an open position. The connection box lid 22 is configured to slide to a closed position as shown in FIG. 10) covering the connection box 24 to retain and seal the first cable end 12 and the connection box slider 21 inside the connection box assembly 10.

Figure 11:
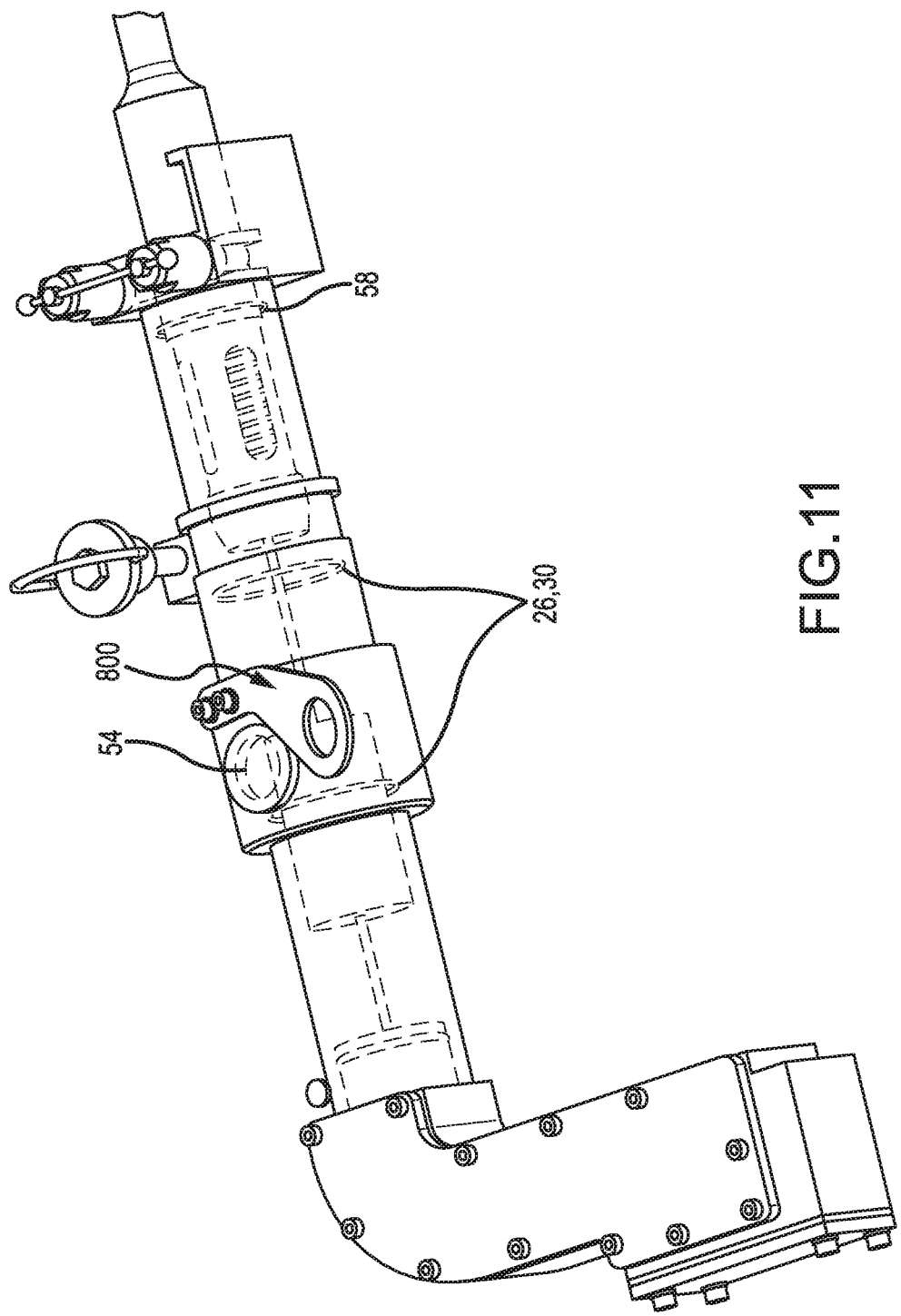
FIG. 11 illustrates the position of a plurality of O-ring seals at various connection box interfaces, according to various embodiments.

While a connection "box" lid 22 and connection "box" 24 have been described, it is to be understood that each is generally cylindrical. More particularly, the connection box lid 22 and the connection box 24 respectively comprise outer and inner concentric substantially hollow cylinders of different operable size. The connection box 24 is of smaller diameter than the connection box lid 22. Referring now briefly to FIG. 11, the connection box lid 22 and the connection box 24 cooperatively define a circular interface for receiving a first O-ring seal 26 and a second O-ring seal 30 between the connection box lid 22 and the connection box 24. When the connection box lid 22 is in the closed position and the first and second O-ring seals 26 and 30 are in position, the connection box assembly 10 according to various embodiments is environmentally sealed against contaminants. The first cable end 12 of the evacuation slide actuation cable 8 is retained and sealed within the connection box assembly 10 when the connection box lid 22 is in the closed position. The connection box 24 has a first end 34 proximate the connection box lid 22 in an open position and an open second end 36. The open second end 36 of the connection box 24 is configured to be sealed with insertion of the first cable end 12 as herein described.

Still referring to FIGS. 1, 2, and 5 through 11, the connection box open second end 36 includes one or more spring-loaded plungers 38 configured to help retain a cable interface connector 40 of the first cable end 12 in the connection box 24. The one or more spring-loaded plungers 38 extend outwardly from a bridge 42 at the connection box second end 36. While two spring-loaded plungers 38 are depicted in the illustrated embodiment, it is to be understood that a fewer or a greater number of spring-loaded plungers may be used.

As noted previously, the connection box lid 22 is coupled to the connection box 24 and the connection box slider 21 is positioned to receive the first cable end 12 of the evacuation slide actuation cable 8 when the connection box lid 22 is in the open position. The connection box lid 22 is also configured to slide to a closed position closing the connection box 24 to retain and seal the first cable end 12 and the connection box slider 21 inside the connection box assembly 10, The connection box lid 22 can also slide in the opposite direction, from the closed position to the open position, for removal of the first cable end 12 from the connection box assembly 10. The first cable end 12 of the evacuation slide actuation cable 8 comprises a housing 78 that includes the cable interface connector 40 connected to a rigid ball end 44 by a free cable length 46.

The connection box slider 21 includes a first safety pin opening 48-1 and a cable installation slot 50 (FIG. 3). The connection box lid 22 includes a second safety pin opening 48-2. (e.g., FIGS. 2 and 10). The first safety pin opening 48-1 in the connection box slider 21 is configured to receive a safety pin 52 during connection of the first cable end 12 of the evacuation slide actuation cable 8 with the connection box assembly 10, thereby preventing evacuation slide inflation system 108 initiation by preventing axial movement of the connection box slider 21. The cable installation slot 50 (FIG. 3) may be shaped like a keyhole to receive the rigid ball end 44 and a portion of the free cable length 46. The connection box slider 21 is configured to move axially (slide) within the connection box assembly 10 to permit initiation of the evacuation slide inflation system 108 when the evacuation slide is activated in response to the overwing emergency exit doors being opened.

The connection box lid 22 may include a viewing window 54. The viewing window may be used to visually verify that the evacuation slide actuation cable 8 (more particularly, the rigid ball end 44 of the cable first end 12) has been properly connected with the connection box slider 21. Proper connection includes receipt of the rigid ball end 44 and the portion of the free cable end 46 in the cable installation slot 50 and closure of the connection box lid. However, as hereinafter described, various embodiments permit verification from inside the aircraft that the evacuation slide actuation cable has been properly installed.

Referring now to FIGS. 1 and 5 through 11, according to various embodiments, an electrical connector blocker 800 may be coupled to the connection box lid 22 of the connection box assembly 10. The electrical connector blocker 800 may be coupled to the connection box lid by one or more fasteners 802 as shown. More particularly, the electrical connector blocker 800 has a first end 804 coupled to the connection box lid 22 and a second free end 806 that physically blocks access to the electrical connector 20 extending from the mounting platform 18 by covering the electrical connector 20 when the connection box lid 22 is in the open position. The second free end 806 may have an opening 808 therein to expose the electrical connector for testing.

When the connection box lid 22 is in the open position as shown in FIGS. 5 through 9, the electrical connector blocker 800 (more specifically the second free end 806 thereof) physically blocks the electrical connector 20 to preclude coupling the electrical harness to the electrical connector 20 (and thus to a pressure monitor for the charged cylinder 14) in response to an attempt being made to install the electrical harness in a reversed, improper order, namely prior to complete installation of the evacuation slide actuator cable 8 (more particularly, the cable first end 12 and the connection box slider 21) in the connection box assembly 10. The electrical connector blocker 800 has a shape to accommodate the orientation of the electrical connector 20. The electrical connector blocker may be angled to accommodate the geometry of the surrounding components. The electrical connector blocker 800 may be comprised of a rigid, non-bendable material to prevent defeat of its intended purpose to ensure installation of the electrical harness only after connection of the first cable end 12 with the connection box assembly 10. The electrical connector blocker comprises a fail-safe device for ensuring that the electrical harness connection to the electric connector 20 can only be installed once installation of the first cable end 12 of the evacuation slide actuation cable 8 into the connection box assembly has been completed (i.e., when the first cable end 12 and the connection box slider 21 are retained and sealed inside the connection box assembly with the connection box lid 22 in the closed position). With the connection box lid in the open position, the electrical connector blocker physically blocks the electrical connector. The electrical connector blocker 800 prevents connection of the electrical connector 20 to the electrical harness (and the pressure sensor) when the connection box lid 22 is in the open position.

Referring now to FIG. 10 illustrating the connection box lid in the closed position, the electrical connector blocker no longer blocks the electrical connector 20 according to various embodiments. With the first cable end 12 fully connected with the (now-closed) connection box assembly 10 (i.e., when the connection box lid is closed), the electrical connector blocker 800 no longer physically blocks the electrical connector, thereby permitting installation of the electrical harness for the pressure monitor.

The ability to install the electrical harness for the pressure monitor enables verification from inside the aircraft that the first cable end of the evacuation slide actuation cable has been installed without having to access the evacuation slide assembly 108 via the access panel in the aircraft. Instead, that the first cable end 12 of the evacuation slide actuation cable 8 has been installed is verified from inside the aircraft because if not connected, the pressure sensor connected to the electrical connector 20 and electrical harness will not provide a pressure reading. Therefore, if there is no pressure reading, the first cable end 12 of the evacuation slide actuation cable has not been installed in the connection box assembly 10.

As noted previously, the first cable end 12 of the evacuation slide actuation cable 8 comprises the housing 78 for the cable interface connector 40 connected to the rigid ball end 44 by the free cable length 46. The cable interface connector 40 is cylindrical and includes an engagement feature 56 on an exterior surface. The cable interface connector 40 fits into the connection box 24 with the one or more spring-loaded plungers 38 at the open second end 36 of the connection box 24 engaging the engagement feature 56 on the cable interface connector 40. A third O-ring seal 58 on the connection box 24 interfaces with the cable interface connector 40 (FIG. 11) to further ensure an environmental seal of the connection box assembly when the connection box lid 22 is in the closed position. The free cable length 46 protrudes beyond the cable interface connector 40 and is configured to be inserted into the cable installation slot 50 in the connection box slider 21 (FIG. 3). The free cable length 46 cannot be extended beyond its adjusted length (i.e., pulled out of the cable interface connector further) due to a stop feature in the cable interface connector 40.

Figure 4:
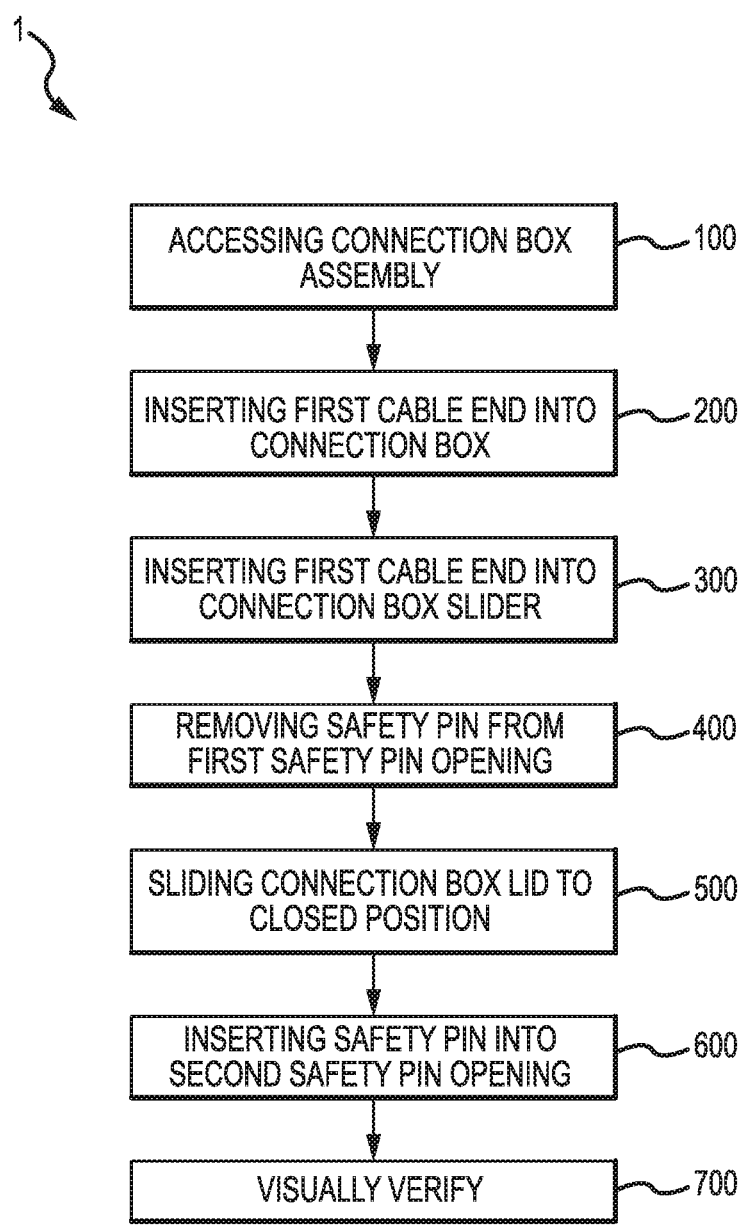
FIG. 4 is a flow diagram of a method for connecting an evacuation slide actuation cable to a connection box assembly, according to various embodiments.

Referring now to FIG. 4 and still referring to FIGS. 5 through 11, according to various embodiments, a method 1 for connecting the evacuation slide actuation cable with the connection box assembly of the emergency evacuation slide and overwing door actuation system interface begins by accessing the connection box assembly 10 on the packboard 4 in the wing to fuselage fairing 60 (step 100). The evacuation slide actuation cable 8 (more particularly, the second cable end) is connected to the manual inflation handle prior to connection of the evacuation slide actuation cable (more particularly, the first cable end 12) with the connection box assembly 10 to avoid inadvertent evacuation slide deployment. Connecting the first cable end 12 with the connection box assembly 10 arms the evacuation slide actuation system.

Figure 6:
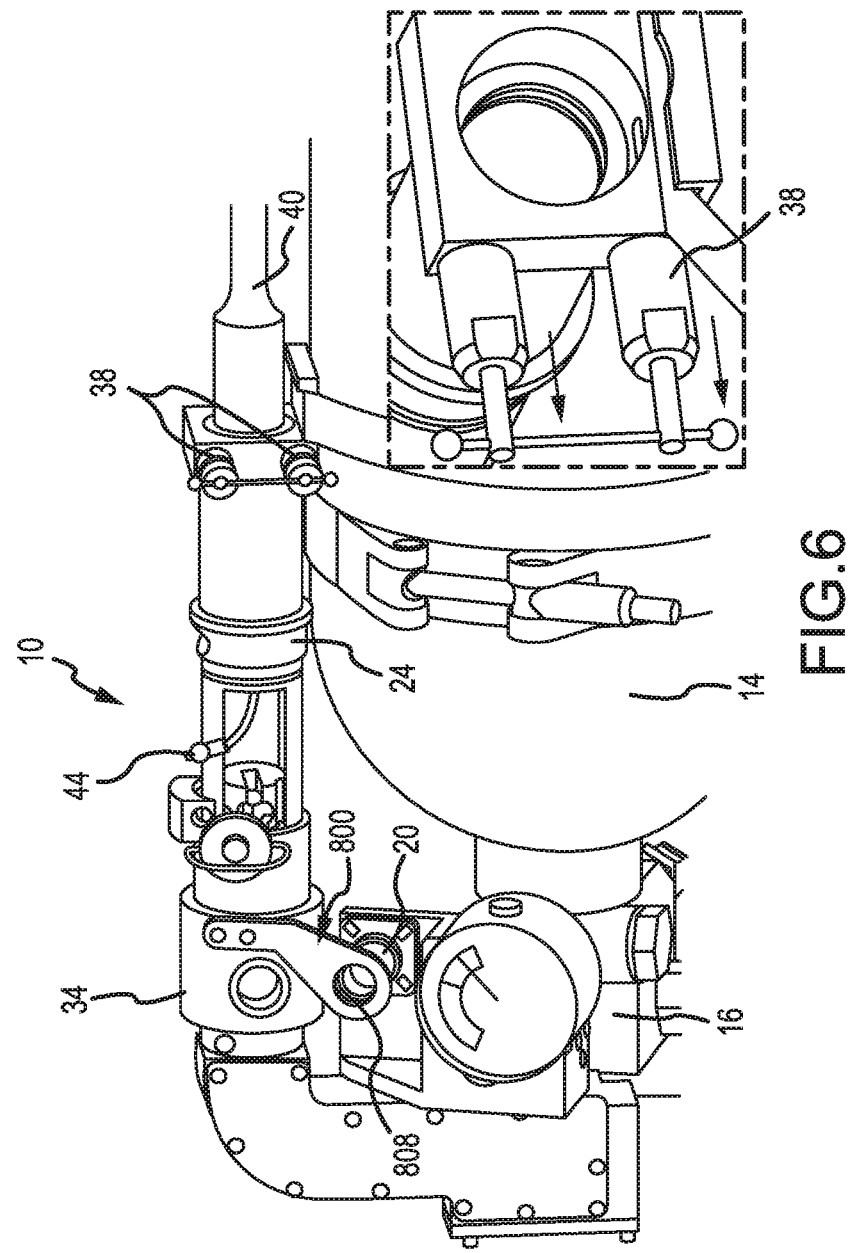
FIG. 6 illustrates pulling the one or more spring-loaded plungers at the open second end of the connection box to retain a cable interface connector of the first cable end (partially shown) in the connection box, according to various embodiments.

Still referring to FIG. 4, and now specifically to FIG. 5, the method 1 for installing the evacuation slide actuation cable in the connection box assembly continues by inserting the first cable end into the connection box (step 200). As noted previously, the first cable end 12 includes the cable interface connector 40 with the engagement feature 56 on the exterior surface thereof. The spring-loaded plungers 38 at the open second end 36 of the connection box 24 are pulled to allow the cable interface connector 40 to "bottom out" in the connection box 24 as shown in FIG. 6.

Figure 7:
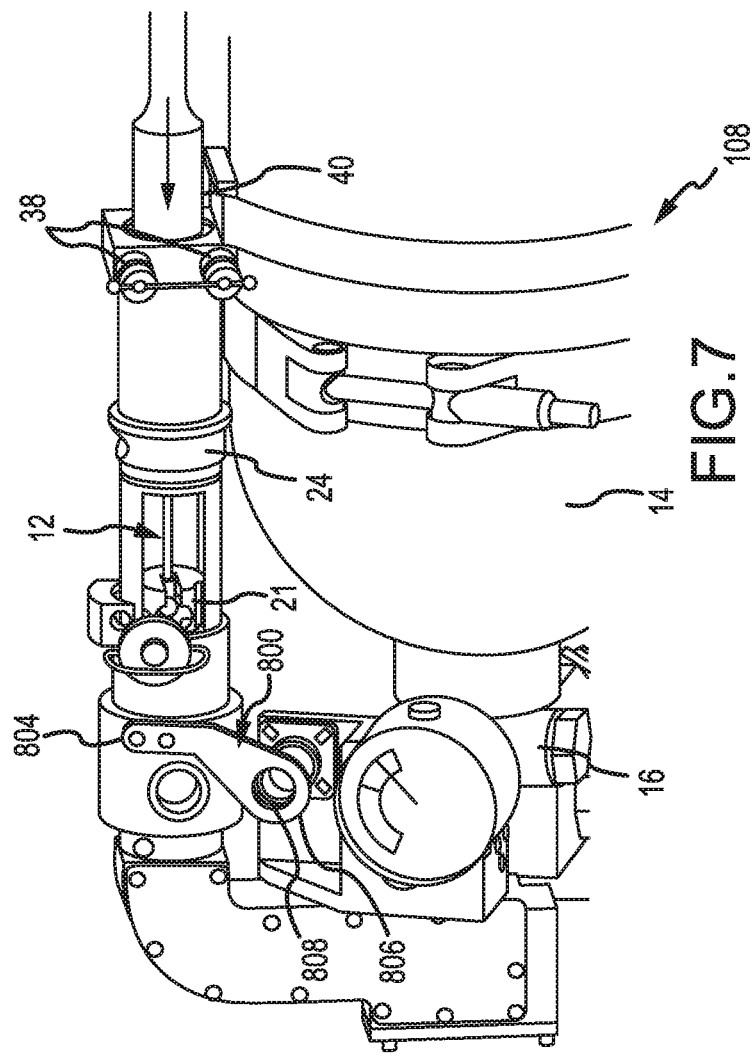
FIGS. 7 and 8 respectively illustrate insertion of the first cable end into the cable installation slot in the connection box slider (FIG. 3) with the connection box lid in the open position and a light pull on the spring-loaded plungers to ensure engagement of the spring-loaded plungers on an engagement feature of the cable interface connector, according to various embodiments.

Still referring to FIG. 4, and now specifically to FIG. 7, according to various embodiments, the method 1 for installing the evacuation slide actuation cable 8 to the connection box assembly of the emergency evacuation slide and overwing door actuation system interface continues by inserting the first cable end 12 into the connection box slider 21 (step 300). With the cable interface connector 40 inside the connection box 24, the spring-loaded plungers 38 are released. The first cable end 12 (more particularly, the rigid ball end 44 and a portion of the free cable length 46) is then inserted into the connection box slider 21 as shown in FIG. 3 (more particularly, into the cable installation slot 50 in the connection box slider 21). To ensure that the spring-loaded plungers 38 are engaged with the engagement feature 56 on the cable interface connector 40, the cable interface connector 40 may be lightly pulled away from the connection box slider 21 as shown in FIG. 8. The cable interface connector 40 is retained inside the connection box 24 by the spring-loaded plungers 38 to ensure that the first cable end 12 is not under tension, thereby avoiding inadvertent deployment of the evacuation slide. The safety pin 52 inserted through the first safety pin opening 48-1 in the connection box slider 21 also prevents inflation system initiation.

Still referring to FIG. 4, and now specifically to FIGS. 9 and 10, according to various embodiments, the method 1 for installing the evacuation slide actuation cable to a connection box assembly continues by removing the safety pin 52 from the first safety pin opening 48-1 in the connection box slider 21 (step 400), then sliding the connection box lid 22 to the closed position (step 500) as shown in FIG. 10, and then inserting the safety pin 52 in the second safety pin opening 48-2 in the connection box lid 22 in the closed position (step 600), thereby completing connection (i.e., installation) of the connection box assembly 10 with the evacuation slide actuation cable 8 (more particularly, the first cable end 12 thereof). The viewing window 54 in the connection box lid 22 may be used to visually verify (step 700) that the first cable end 12 of the evacuation slide actuation cable 8 has been properly installed (i.e., retained and sealed inside the connection box assembly when the connection box lid is in the closed position) (step 700).

Figure 12:
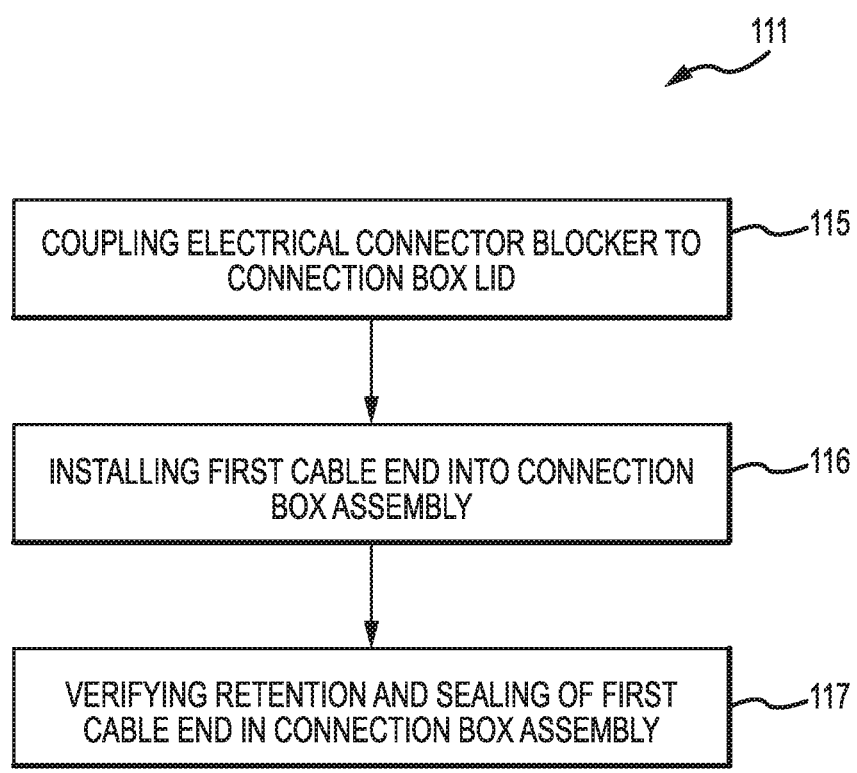
FIG. 12 illustrates a flow diagram of an installation assurance method for connection of an evacuation slide actuation cable to an aircraft, according to various embodiments.

Referring now to FIG. 12, according to various embodiments, an installation assurance method 111 for connection of an evacuation slide actuation cable to an aircraft is disclosed. The installation assurance method 111 begins by coupling the electrical connector blocker 800 to the connection box lid (step 115). As noted previously, the electrical connector blocker 800 is configured to prevent connection of the electrical connector to the electrical harness prior to retaining and sealing the first cable end 12 and the connection box slider 21 inside the connection box assembly 10. Coupling the electrical connector blocker 800 to the connection box lid 22 physically blocks the electrical connector when the connection box lid 22 is in the open position and exposes the electrical connector when the connection box lid 22 is in the closed position. Coupling the electrical connector blocker 800 to the connection box lid 22 comprises fastening the first end of the electrical connector blocker 800 to the connection box lid 22. The installation assurance method 111 continues by installing the first cable end 12 of the evacuation slide actuation cable 8 inside the connection box assembly (step 116) as previously described. Step 116 comprises previously-described steps 200 through 600 of method 1 (FIG. 4) for connecting the evacuation slide actuation cable with the connection box assembly of the emergency evacuation slide and overwing door actuation system interface. The installation assurance method 111 may further comprise verifying retention and sealing of the first cable end inside the connection box assembly from inside the aircraft by determining if there is a pressure sensor reading from the charged cylinder operatively coupled to the electrical harness (step 117). If there is no pressure sensor reading, the first cable end 12 of the evacuation slide actuation cable 8 is not retained and sealed inside the connection box assembly, thereby providing an alert that connection is still required.

From the foregoing, it is to be appreciated that various embodiments ensure that installation of the evacuation slide actuator cable is complete such that inflation of the evacuation slide will begin if the aircraft door is opened in an armed position. Various embodiments also provide the ability to verify that the installation is complete from within the aircraft, thereby no longer necessitating a visual verification in the packboard. It is also to be appreciated that a consistent installation sequence of the cable first end into the connection box assembly 10 followed by electrical connection may be maintained through use of the systems and devices according to various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at leak one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A connection box assembly for connecting an evacuation slide actuation cable of an evacuation slide actuation system to an evacuation slide inflation system, the connection box assembly comprising:
   a connection box;
   a connection box lid coupled to the connection box and configured to slide between an open position and a closed position;
   an electrical connector blocker coupled to the connection box lid and configured to prevent electrical connection to an electrical connector coupled to the evacuation slide inflation system when the connection box lid is in the open position and to permit electrical connection to the electrical connector when the connection box lid is in the closed position; and
   a connection box slider disposed within the connection box and positioned to receive a first cable end of the evacuation slide actuation cable when the connection box lid is in the open position, wherein the connection box lid in the closed position closes the connection box to retain and seal the connection box slider and the first cable end inside the connection box assembly.

2. The connection box assembly of claim 1, wherein the electrical connector is configured to be connected to an electrical harness from the aircraft in response to the electrical connector blocker permitting electrical connection.

3. The connection box assembly of claim 2, wherein the electrical connector blocker permits connection of the electrical harness to the electrical connector in response to the first cable end of the evacuation slide actuation cable and the connection box slider being retained and sealed inside the connection box assembly.

4. The connection box assembly of claim 3, Therein connection of the electrical harness to the electrical connector permits a pressure sensor reading that does not occur if the first cable end of the evacuation slide actuation cable and the connection box slider are not retained and sealed inside the connection box assembly.

5. The connection box assembly of claim 1, wherein the electrical connector blocker has a first end coupled to the connection box lid and a second free end opposite to the first end and configured to physically block the electrical connector by covering the electrical connector when the connection box lid is in the open position and to expose the electrical connector by uncovering the electrical connector when the connection box lid is in the closed position.

6. The connection box assembly of claim 5, wherein the electrical connector blocker comprises a rigid, non-bendable material.

7. The connection box assembly of claim 5, wherein the second free end has an opening therein to expose the electrical connector.

8. A system for assuring connection of an evacuation slide actuation cable to an evacuation slide inflation system, the system comprising:
   an electrical connector coupled to the evacuation slide inflation system; and
   a connection box assembly comprising:
      a connection box;
      a connection box Rd coupled to the connection box and configured to slide between an open position and a closed position;
      a connection box slider disposed within the connection box and positioned to receive a first cable end of the evacuation slide actuation cable when the connection box lid is in the open position, wherein the connection box lid in the closed position closes the connection box to retain and seal the connection box slider and the first cable end inside the connection box assembly; and
      an electrical connector blocker coupled to the connection box lid for preventing electrical connection to the electrical connector prior to retaining and sealing the first cable end and the connection box slider in the connection box assembly.

9. The system of claim 8, wherein the electrical connector blocker is configured to physically block the electrical connector when the connection box lid is in the open position and to expose the electrical connector when the connection box lid is in the closed position.

10. The system of claim 9, wherein the electrical connector is configured to be connected to an electrical harness from the aircraft when the electrical connector is exposed.

11. The system of claim 10, wherein the electrical connector blocker permits connection of the electrical harness to the electrical connector only after the connection box lid is in the closed position and the first cable end of the evacuation slide actuation cable and the connection box slider have been retained and sealed inside the connection box assembly.

12. The system of claim 11, wherein connection of the electrical harness to the electrical connector permits a pressure sensor reading that does not occur if the first cable end and the connection box slider are not retained and sealed inside the connection box assembly.

13. The system of claim 8, wherein the electrical connector blocker has a first end coupled to the connection box lid and a second free end opposite to the first end and configured to physically block the electrical connector by covering the electrical connector when the connection box lid is in the open position and to expose the electrical connector by uncovering the electrical connector when the connection box lid is in the closed position.

14. The system of claim 8, wherein the electrical connector blocker comprises a rigid, non-bendable material.

15. The system of claim 13, wherein the second free end has an opening therein to expose the electrical connector.

16. An installation assurance method comprising:
   coupling an electrical connector blocker to a connection box lid of a connection box assembly comprising:
      the electrical connector blocker;
      a connection box;
      the connection box lid coupled to the connection box and configured to slide between an open position and a closed position; and
      a connection box slider disposed within the connection box;
   sliding the connection box lid to the open position wherein the electrical connector blocker prevents electrical connection to an electrical connector coupled to an evacuation slide inflation system;
   inserting a first cable end of the evacuation slide actuation cable into the connection box and the connection box slider; and
   sliding the connection box lid to the closed position thereby closing the connection box to retain and seal the connection box slider and the first cable end inside the connection box assembly and permitting electrical connection to the electrical connector only after the connection box slider and the first cable end are retained and sealed inside the connection box assembly.

17. The installation assurance method of claim 16, wherein coupling the electrical connector blocker to the connection box lid physically blocks the electrical connector when the connection box lid is in the open position and exposes the electrical connector when the connection box lid is in the closed position.

18. The installation assurance method of claim 17, wherein coupling the electrical connector blocker to the connection box lid comprises fastening a first end of the electrical connector blocker to the connection box lid, the electrical connector blocker having a free second end for covering the electrical connector for physically blocking thereof.

19. The installation assurance method of claim 17, wherein the electrical connector is configured to be connected to an electrical harness from the aircraft when the electrical connector is exposed, the method further comprising verifying retention and sealing of the first cable end and the connection box slider inside the connection box assembly if there is a pressure sensor reading from a charged cylinder operatively coupled to the electrical harness.

20. The installation assurance method of claim 19, wherein verifying retention and sealing of the first cable end and the connection box slider inside the connection box assembly is from inside the aircraft.

* * * * *